United States Patent [19]

Jakobi et al.

[11] 4,083,793

[45] Apr. 11, 1978

[54] WASHING COMPOSITIONS CONTAINING ALUMINOSILICATES AND NONIONICS AND METHOD OF WASHING TEXTILES

[75] Inventors: Günter Jakobi, Hilden; Peter Krings, Krefeld; Milan Johann Schwuger, Haan; Heinz Smolka, Langenfeld, all of Germany

[73] Assignee: Henkel Kommanditgesellschaft auf Aktien, Dusseldorf-Holthausen, Germany

[21] Appl. No.: 723,728

[22] Filed: Sep. 16, 1976

Related U.S. Application Data

[63] Continuation of Ser. No. 458,326, Apr. 5, 1974, abandoned.

[30] Foreign Application Priority Data

May 23, 1973 Austria ................................ 4484/73

[51] Int. Cl.[2] ........................ B01J 1/04; C11D 1/825; C11D 1/831; C11D 3/12

[52] U.S. Cl. .................................. 252/99; 252/89 R; 252/131; 252/135; 252/140; 252/179; 252/540; 252/DIG. 1

[58] Field of Search .................. 252/DIG. 1, 89, 131, 252/140, 179, 99, 539, 540, 559

[56] References Cited

U.S. PATENT DOCUMENTS

| | | | |
|---|---|---|---|
| 2,677,665 | 5/1954 | James | 252/131 |
| 3,619,119 | 11/1971 | Felletschin | 8/137 |
| 3,679,608 | 7/1972 | Aubert | 252/526 |
| 3,755,180 | 8/1973 | Austin | 252/99 |
| 3,812,041 | 5/1974 | Inamorato | 252/89 |
| 3,849,347 | 11/1974 | Tokiwa | 252/545 |
| 3,850,832 | 11/1974 | Wegemund | 252/99 |
| 3,862,058 | 1/1975 | Nirschl | 252/528 |
| 3,948,819 | 4/1976 | Wilde | 252/545 |
| 3,985,669 | 10/1976 | Krummel | 252/116 |

FOREIGN PATENT DOCUMENTS

| | | | |
|---|---|---|---|
| 860,898 | 1/1971 | Canada | 252/540 |
| 2,055,423 | 5/1972 | Germany | 252/179 |
| 2,422,655 | 11/1974 | Germany | 252/131 |

*Primary Examiner*—Dennis L. Albrecht

*Attorney, Agent, or Firm*—Hammond & Littell

[57] ABSTRACT

A method of washing soiled textiles, wherein the soiled textiles are immersed in an aqueous liquor which contains at least one compound inhibiting alkaline earth metal ion precipitation on said soiled textiles and surface-active compounds comprising using finely-dispersed, water-insoluble silicate compounds having a calcium-binding power of at least 50 mg CaO/gm of anhydrous active substance and having the formula, combined water not shown $$(M_{2/n}O)_x \cdot Me_2O_3 \cdot (SiO_2)_y$$

where M is a cation of the valence n, exchangeable with calcium, $x$ is a number of from 0.7 to 1.5, Me is a member selected from aluminum and boron and y is a number of from 0.8 to 6, as said compound inhibiting alkaline earth metal ion precipitation, together with surface-active compounds including non-ionic surface-active compounds being constituted by a mixture of compounds of different degrees of ethoxylation where one of the ethoxylated compounds has 8 to 20 ethylene oxide units and the other has from 2 to 6 ethylene oxide units; as well as washing compositions containing said silicate compounds and said surface-active compounds.

1 Claim, No Drawings

WASHING COMPOSITIONS CONTAINING ALUMINOSILICATES AND NONIONICS AND METHOD OF WASHING TEXTILES

This is a continuation of Ser. No. 458,326, filed Apr. 5, 1974, and now abandoned.

As known, the detergents used in the household, in commercial establishments and in industry, frequently contain large quantities of condensed phosphates, particularly tripolyphosphates. These are provided to sequester the hardness formers of tap water and are responsible to a great extent for increasing the cleaning power of the capillary-active washing substances. The phosphorus content of these agents has been criticized by the public in connection with questions of the protection of the environment. The view is frequently expressed that the phosphates, which arrive in the rivers and lakes after treatment of the sewage, have great influence on the eutrophication of the waters, and is said to lead to an increase of the growth of algae and of oxygen consumption. It has therefore been tried to eliminate phosphate from the washing and cleaning processes or from the agents used for this purpose, or at least to substantially reduce its proportion.

In DOS (German Published Patent Application) 1,617,058, it has already been suggested to use flat fabrics or sheets of water-insoluble cellulose derivatives, particularly phosphorylated cotton, during the washing process for softening the water. But this proposal does not represent a technically feasible solution of the problem since too large amounts of phosphorylated cotton have to be added to bind the hardening constituents of the water. The other cellulose derivatives mentioned in the same proposal, namely sulfethoxy cellulose, carboxymethyl cellulose and the succinic acid half esters of cellulose, have only a weak calcium binding power and are therefore hardly suitable for use in practice.

In DOS 2,055,423, water-insoluble cation-exchanging polymers which are insoluble in water and alkaline solutions are suggested for the same purpose, such as cross-linked copolymers of polyacrylic acid or polymethacrylic acid with divinyl compounds, for example benzene, as well as their sulfonation products. These are used in powdered to granular form (grain size 0.22 to 1.2 mm). They are either added directly to the washing compositions or they are filled first into water-permeable containers or bags and placed in this form in the wash liquor. But it can be shown experimentally that the ion exchangers packed in containers, though they can bind the hardening constituents of the wash liquor, albeit at a slower rate, have no washing effect in this form, not even if a good circulation through the exchanger container is ensured. A satisfactory soil-releasing effect can only be observed if the exchanger particles can come in direct contact with the textile fiber during the washing process, that is, if the powdered to granular material is added directly to the washing composition or to the wash liquor. But this procedure has a number of serious disadvantages if the exchanger resins indicated in DOS 2,055,423 are used because exchanger particles which are trapped in the textile material are no longer washed out completely during the following rinsing cycle. Rather, they remain on the textile material as impurities and become inseparately cemented with the fiber during the following heat treatment, for example, hot drying, hot mangling or ironing. In summation, the washing effect of these polymers is relatively low and their use in the wash liquor brings hardly any advantages compared to an arrangement of the exchanger in a series-connected water softening plant.

In copending, commonly-assigned U.S. Pat. Application Ser. No. 458,306, filed Apr. 5, 1974, now abandoned, and its continuation application Ser. No. 800,308, filed May 25, 1977, an improvement in the process of washing and bleaching textiles is described wherein the soiled textiles are immersed in an aqueous solution containing a water softening agent for a time sufficient to disperse or dissolve the soil from said soiled textiles into said aqueous solution, separating said aqueous solution and recovering said textiles substantially soil-free. This improvement consists of using at least one finely-dispersed water-insoluble silicate compound containing at least some combined water and having a calcium binding power of at least 50 mg CaO/gm of anhydrous active substance and the formula on the anhydrous basis $$(M_{2/n}O)_x \cdot Me_2O_3 \cdot (SiO_2)_y$$

where M is a cation of the valence *n*, exchangeable with calcium, *x* is a member of from 0.7 to 1.5, Me is a member selected from the group consisting of aluminum and boron, and *y* is a number from 0.8 to 6, as said water softening agent.

The calcium binding power of the silicate compounds can be as high as 200 mg CaO/gm of anhydrous active substance (AS) and preferably is in the range of 100 to 200 mg CaO/gm AS.

The cation M employed is preferably sodium. However, the same can also be totally or partially replaced by other cations exchangeable with calcium, such as hydrogen, lithium, potassium, ammonium or magnesium, as well as by the cations of water-soluble organic bases, for example, by those of primary, secondary or tertiary alkylamines or alkylolamines with not more than 2 carbon atoms per alkyl radical, or not more than 3 carbon atoms per alkylol radical.

OBJECTS OF THE INVENTION

An object of the present invention is the solution of the above-outlined problem of finding a non-polluting washing method which does not have the above-described inconveniences and which particularly does not burden the waste water with phosphate.

Another object of the present invention is the development in the process of washing soiled textiles by contacting soiled textiles with an aqueous solution containing a water softening agent and containing a sufficient amount of a surface-active compound compatible with alkaline wash liquors whereby said soil is dispersed from said soiled textiles, for a time sufficient to disperse or dissolve the soil from said soiled textiles into said aqueous solution, separating said aqueous solution and recovering said textiles substantially soil-free, of the improvement which consists of using at least one finely-dispersed, water-insoluble silicate compound containing at least some combined water and having a calcium binding power of at least 50 mg CaO/gm of anhydrous active substance and the formula on the anhydrous basis $$(M_{2/n}O)_x \cdot Me_2O_3 \cdot (SiO_2)_y$$

where M is a cation of the valence *n*, exchangeable with calcium, *x* is a number of from 0.7 to 1.5, Me is a member selected from the group consisting of aluminum and boron, and *y* is a number from 0.8 to 6, as said water softening agent, and from 1 part by weight of nonionic suface-active compounds and from 0 to 3 parts by weight of anionic surface-active compounds, as said surface active compound, said nonionic surface-active compounds being a mixture of a compound having a labile hydrogen and from 8 to 18 carbon atoms ethoxylated with from 8 to 20 ethylene oxide units and a compound having a labile hydrogen and from 10 to 18 carbon atoms ethoxylated with from 2 to 6 ethylene oxide units in a weight ratio of 1:0.2 to 2.

A yet further object of the present invention is the development of a detergent system for washing soiled textiles comprising the above water-insoluble silicate compound and the above surface-active components in a low to zero phosphate textile detergent.

These and other objects of the invention will become more apparent as the description thereof proceeds.

DESCRIPTION OF THE INVENTION

The invention concerns a method for washing or bleaching textiles, by treating these materials with a liquor which contains substances that are capable of binding the hardening constituents of the water and surface-active substances. The method concerns the use of a finely-dispersed, water-insoluble silicate compound and a mixture of nonionic surface-active compounds during the washing process and in connection with low to zero phosphate textile detergents. It is characterized in that at least one finely-dispersed, water-insoluble silicate compound containing combined water in the given case, having a calcium binding power of at least 50 mg CaO/gm of anhydrous active substance and the general formula (on the anhydrous basis)

$$(M_2/nO)_x \cdot {}_{Me_2}O_3 \cdot (SiO_2)_y$$

where M is a cation of the valence *n*, exchangeable with calcium, *x* is a number from 0.7 to 1.5, preferably from 0.7 to 1.1, Me is aluminum or boron, and *y* is a number from 0.8 to 6, preferably from 1.3 to 2.4, is suspended in the aqueous washing liquor and the aqueous washing liquor contains from 1 part by weight of nonionic surface-active compounds and from 0 to 3 parts by weight of anionic surface-active compounds, as said surface-active compound, said nonionic surface-active compounds being a mixture of a compound having a labile hydrogen and from 8 to 18 carbon atoms ethoxylated with from 8 to 20 ethylene oxide units and a compound having a labile hydrogen and from 10 to 18 carbon atoms ethoxylated with from 2 to 6 ethylene oxide units in a weight ratio of 1:0.2 to 2. The above combination of silicate compound and surface-active compound, particularly when the surface-active component is employed at a concentration of preferably 0.3 to 3 gm/liter, brings about an improved dirt removal, in particular with fats and oily soils.

The water-insoluble silicate compounds will hereafter be called ¢aluminosilicates" for simplicity's sake. Preferred are sodium aluminosilicates. All date given for their production and use also apply to the other compounds claimed.

The above-defined aluminosilicates can be produced synthetically in a simple manner, for example, by reacting water-soluble silicates with water-soluble aluminates in the presence of water. To this end aqueous solutions of the starting materials can be mixed with each other, or one component which is present in solid form can be reacted with another component which is present as an aqueous solution. The desired aluminosilicates can also be obtained by mixing both solid components in the presence of water. Aluminosilicates can also be produced from $Al(OH)_3$, $Al_2O_3$ or $SiO_2$ by reaction with alkali metal silicate or alkali metal aluminate solutions, respectively. Finally, such substances are also formed from the melt, but this method seems of less economical interest because of the required high melting temperature and the necessity of transforming the melt into finely-dispersed products.

The cation-exchanging aluminosilicates to be used according to the invention are only formed if special precipitation conditions are maintained, otherwise products are formed which have no, or an inadequate, calcium exchanging power. The calcium exchanging power of at least 50 mg CaO/gm of anhydrous active substance (AS) is critical to the present process. If aluminosilicates are employed with below the critical limit of calcium exchanging power, very little if any soil removal from the soiled textiles is effected in the absence of other types of calcium sequestering or precipitating agents. The production of useable aluminosilicates according to the invention is described in the experimental part.

The aluminosilicates in aqueous suspension produced by precipitation or by transformation in finely-dispersed form according to other methods can be transformed from the amorphous into the aged or into the crystalline state by heating the suspension to temperatures of 50° to 200° C. However, there is hardly any difference between these two forms as far as the calcium binding power is concerned. Aside from the drying conditions, the calcium binding power of the aluminosilicates is proportional to the amount of aluminum contained therein with reference to the amount of silicon. Nevertheless, the crystalline aluminosilicates are preferred for the purpose of the invention. The preferred calcium binding power, which is in the range of 100 to 200 mg CaO/gm AS, is found primarily in compounds of the composition:

$$0.7 \text{ to } 1.1\ Na_2O \cdot Al_2O_3 \cdot 1.3 \text{ to } 3.3\ SiO_2$$

This summation formula comprises two types of different crystal structures (or their non-crystalline initial products) which also differ by their summation formulas.

These are:

(a) 0.7 to 1.1 $Na_2O \cdot Al_2O_3 \cdot$ 1.3 to 2.4 $SiO_2$ (b) 0.7 to 1.1 $Na_2O \cdot Al_2O_3 \cdot > 2.4$ to 3.3 $SiO_2$ The different crystal structures can be seen in the X-ray diffraction diagram. The d-values found are given in the examples in the description of the production of the aluminosilicates I and II. Aluminosilicates having the summation formula a) above are preferred in the present process and composition.

The amorphous or crystalline aluminosilicate contained in the aqueous suspension can be separated by filtration from the remaining aqueous solution and be dried at temperatures of 50° to 800° C, for example. Depending on the drying conditions, the product contains more or less combined water. Anhydrous products are obtained by drying 800° C. If we want to remove the water completely, this can be done by heating for 1 hour to 800° C. This is the way the AS contents of the aluminosilicates are also determined.

Such high drying temperatures are not recommended for the aluminosilicates to be used according to the invention, preferably the temperature should not exceed 400° C. It is of particular advantage that even products dried at substantially lower temperatures of 80° to 200° C, for example, until the adhering liquid water is removed, can be used for the purposes of the invention. The aluminosilicates thus produced, which contain varying amounts of combined water, are obtained after the disintegration of the dried filter cake, as fine powders whose primary particle size does not exceed 0.1 mm, but is mostly lower and ranges down to dust fineness, for example, to 0.1 $\mu$. It must be kept in mind that the primary particles can be agglomerated to larger structures. In some production methods primary particle sizes ranging from 50 to 1 $\mu$ are obtained.

Of particular advantage are aluminosilicates having at least 80% by weight of particles of 10 to 0.01 $\mu$, preferably 8 to 0.1 $\mu$. These aluminosilicates preferably contain no primary or secondary particles above 40 $\mu$. As far as the products are crystalline, they are "microcrystalline."

The formation of smaller particle sizes can already be enhanced by the precipitation conditions. For these smaller particle sizes, the intermixed aluminate and silicate solutions, which can also be introduced simultaneously into the reaction vessel, are subjected to great shearing forces. If crystalline aluminum silicates are produced, which are preferred according to the invention, the formation of larger or inter-penetrating crystals is prevented by slowly stirring the crystallizing mass.

Nevertheless, undesired agglomeration of crystal particles can occur during the drying, so that it is advisable to remove these secondary particles in a suitable manner, for example, by air sifting. Aluminosilicates obtained in coarser form, which are ground to the desired particle size, can also be used. Suitable for this purpose are, for example, mills and/or air sifters or combinations thereof. The latter are described, for example, in Ullmann, "Enzyklopadie der technischen Chemie" vol. 1, 1951, p. 632 to 634.

From the sodium aluminosilicates, aluminosilicates of other cations, for example, those of potassium, magnesium or water-soluble organic bases can be produced in a simple manner by the exchange of bases. The use of these compounds instead of the sodium aluminosilicates may be of advantage if a special effect is to be achieved by the supply of the said cations, for example, if the state of dissolution of different surface-active compounds simultaneously present in the composition is to be influenced.

These prepared aluminosilicates, that is, produced prior to their use, are used for the purposes of invention.

The amount of aluminosilicate required to achieve a good washing effect depends, on the one hand, on its calcium binding power, and on the other hand, on the amount and the type of soil of the textiles to be treated, and on the amount and hardness of the water used. If hard water is used, it is advisable to select the amount of aluminosilicate so that the residual hardness of the water does not exceed 5° dH (corresponding to 50 mg CaO/l), preferably 0.5° to 2° dH (corresponding to 5 to 20 mg CaO/l). In order to obtain an optimum washing effect, it is advisable, particularly for greatly soiled textiles, to use a certain excess of aluminosilicate, in order to bind completely or partially the hardening constituents contained in the released soil. The concentration of the aluminosilicates can thus be in the range from 0.2 to 10 gm AS/l, preferably 1 to 6 gm AS/l.

It was also found that the dirt can be removed much faster and/or more completely if another substance is added to the wash liquor which has a sequestering and/or precipitating effect on the calcium which is contained in the water as a hardening substance. Suitable as other sequestering agents for calcium for the purposes of the invention are also substances with such a low sequestering power that they are not considered heretofore as sequestering agents for calcium. However, these compounds frequently have the capacity of delaying the precipitation of calcium carbonate from aqueous solutions.

Preferably, amounts of sequestering or precipitating agents of, for example, 0.05 to 2 gm/l, are added to accelerate or improve the removal of dirt. Preferred are amounts of 0.1 to 1 gm/l. Substantially larger amounts can also be used, but if phosphorus-containing sequestering or precipitating agents are used, their amount should be so selected that the phosphorus load of the sewage is much less than with the presently used triphosphate-based detergents.

Organic compounds which are used as sequestering or precipitating agents for calcium are the polycarboxylic acids, hydroxycarboxylic acids, aminocarboxylic acids, carboxyalkyl ethers of alkanepolyols, polyanionic polymers, particularly the polymeric carboxylic acids and the phosphonic acids, these compounds being used mostly in the form of their water-soluble salts.

Examples for polycarboxylic acids are the alkane polycarboxylic acids having from 2 to 20 carbon atoms, and the alkene polycarboxylic acids having from 4 to 10 carbon atoms, such as the dicarboxylic acids of the general formula $$HOOC-(CH_2)_n-COOH$$

where $n$ is an integer from 0 to 8, as well as maleic acid, fumaric acid, methylenemalonic acid, citraconic acid, mesaconic acid, itaconic acid, non-cyclic polycarboxylic acids with at least 3 carboxyl groups in the molecule, like tricarballylic acid, aconitic acid, ethylene tetracarboxylic acid, 1,1,3,3-propane-tetracarboxylic acid, 1,1,3,3,5,5-pentane-hexacarboxylic acid, hexanehexacarboxylic acid, cyclic di- or polycarboxylic acids, such as cyclopentane-tetracarboxylic acid, tetrahydrofuran-tetracarboxylic acid, cyclohexane-hexacarboxylic acid, phthalic acid, terephthalic acid, benzene, tri-, tetra- or pentacarboxylic acid as well as mellitic acid.

Examples for hydroxyalkanemono or polycarboxylic acids and hydroxybenzenemono or polycarboxylic acids are glycolic acid, lactic acid, malic acid, tartronic acid, methyltartronic acid, gluconic acid, glyceric acid, citric acid, tartaric acid, salicylic acid.

Examples for aminocarboxylic acids are glycine, glycylglycine, alanine, aspargine, glutamic acid, aminobenzoic acid, iminodi- or triacetic acid, hydroxyethyliminodiacetic acid, ethylenediaminetetraacetic acid, hydroxyethyl-ethylenediaminetriacetic acid, diethylenetriaminepentaacetic acid, as well as higher homologs which can be prepared by polymerization of a N-aziridyl carboxylic acid derivative, for example, of acetic acid, of succinic acid, of tricarballylic acid, and subsequent saponification, or by condensation of polyamines with a molecular weight of 500 to 10,000 with chloracetic acid salts or bromacetic acid salts.

Examples for carboxyalkyl ethers are 2,2-oxydisuccinic acid and other ether-linked polycarboxylic acids, particularly polycarboxylic acids containing carboxymethyl ether groups which include corresponding derivatives of the following polyhydric alcohols or hydrocarboxylic acids, which can be completely or partly etherified with glycolic acid, such as ethylene glycol, di- or trioxyethylene glycols, glycerin, di- or triglycerin, glycerin monomethyl ether, 2,2-dihydroxymethyl-propanol, 1,1,1-trihydroxymethyl-ethane, 1,1,1-trihydroxymethyl-propane, erythrite, pentaerythrite, glycolic acid, lactic acid, tartronic acid, methyltartronic acid, glyceric acid, erythronic acid, malic acid, citric acid, tartaric acid, trihydroxyglutaric acid, saccharic acid, mucic acid. In addition, the carboxymethyl ethers of sugar, starch and cellulose are mentioned as transition types to the polymeric carboxylic acids.

Among the polyanionic polymers, the polymeric carboxylic acids are particularly of interest, for example, the polymers of acrylic acid, hydroxyacrylic acid, maleic acid, itaconic acid, mesaconic acid, aconitic acid, methylenemalonic acid, citraconic acid, etc., the copolymers of said carboxylic acids with each other or with ethylenically-unsaturated compounds, such as ethylene, propylene, isobutylene, vinyl alcohol, vinylmethyl ether, furan, acrolein, vinyl acetate, acrylamide, acrylonitrile, methacrylic acid, crotonic acid, etc., such as 1:1 copolymers of maleic acid anhydride with ethylene or propylene or furan.

Other polyanionic polymers of the type of polyhydroxypolycarboxylic acids or polyaldehydropolycarboxylic acids are substances substantially composed of acrylic acid and acrolein units or of acrylic acid and vinyl alcohol-units, which can be obtained by copolymerization of acrylic acid and acrolein or by polymerization of acrolein and subsequent Cannizzaro reaction, if necessary, in the presence of formaldehyde.

Examples of phosphorus-containing organic sequestering agents are the alkanepolyphosphonic acids, aminoalkane polyphosphonic acids, hydroxyalkane polyphosphonic acids and phosphonocarboxylic acids, such as the compounds methanediphosphonic acid, propane-1,2,3-triphosphonic acid, butane-1,2,3,4-tetraphosphonic acid, polyvinyl phosphonic acid, 1-aminoethane-1,1-diphosphonic acid, 1-amino-1-phenyl-methane-1,1-diphosphonic acid, amino-trimethylenephosphonic acid, methyl-amino-dimethylenephosphonic acid, ethylaminodimethylenephosphonic acid, ethylenediaminetetramethylenephosphonic acid, 1-hydroxyethane-1,1-diphosphonic acid, phosphonoacetic acid, phosphonopropionic acid, 1-phosphonoethane-1,2-dicarboxylic acid, 2-phosphonopropane-2,3-dicarboxylic acid, 2-phosphonobutane-1,2,4-tricarboxylic acid, 2-phosphonobutane-2,3,4-tricarboxylic acid, as well as copolymers of vinyl phosphonic acid and acrylic acid.

By using the above-described aluminosilicates according to the invention it is readily possible, even when using phosphorus-containing inorganic or organic sequestering or precipitating agents for calcium, to keep the phosphorus content of the wash liquors at a maximum of 0.6 gm/l, preferably at a maximum of 0.3 gm/l. But it is also possible to effect the method of the invention in the absence of phosphorus-containing compounds with good results.

The field of application of the invention is the washing and bleaching of textiles of all kinds in industry, in commercial laundries, and in the household.

The textiles to be washed can consist of various fibers of natural or synthetic origin. These include cotton, regenerated cellulose or linen, as well as textiles which contain highly processed cotton or synthetic chemical fibers, like polyamide, polyester, polyacrylonitrile, polyurethane, polyvinyl chloride or polyvinylidene chloride fibers. The detergents according to the invention can also be used for washing synthetic fiber-cotton blends called "wash and wear", occasionally also "no-iron" fabrics.

When washing these textiles by using cleaning liquors containing aqueous aluminosilicates in suspension and the surface-active components, the washing or cleaning can be improved by common ingredients of these wash liquors. These include, for example, surface-active or non-surface-active foam stabilizers or inhibitors, textile softeners, neutral or alkaline-reacting builder salts, chemical bleaches, as well as stabilizers and/or activators for the latter, soil suspension agents, corrosion-inhibitors, antimicrobial substances, enzymes, brighteners, dyes and perfumes.

When using one or several of the above-mentioned substances, normally contained in wash or cleaning liquors, the following concentrations are preferably maintained:

0.2 to 10 gm/l of the aluminosilicate component which may include up to 2 gm/l of other calcium sequestering or precipitating agents.
0.3 to 3 gm/l of the surface-active component
0 to 6 gm/l of builder salts
0 to 0.4 gm/l of active oxygen or equivalent amouns of active chlorine as a bleach.

The pH-value of the liquors can be between 6 and 13, preferably between 8.5 and 12, depending on the type of textile to be washed.

For a long time, attempts have been made to find a suitable substitute for phosphates which can not only bind calcium but which are also biodegradable in sewage. Various organic compounds have, therefore, been suggested as phosphate substitutes. The technical teaching of the invention of using for this purpose water-insoluble cation-exchanging aluminosilicates is therefore a complete abandonment of the general direction in which the industry has worked. It is particularly surprising that the water-insoluble aluminosilicates used in the invention are completely washed out from the fabrics. The use of the aluminosilicates means a relief of the sewage in two respects. The amounts of phosphorus arriving in the sewage are greatly reduced or completely eliminated, and the aluminosilicates require less oxygen for biological degradation. They are of a mineral nature, settle gradually in the clarifying plants or in natural waters and thus meet the ideal requisites of a phosphate substitute.

But they are also superior to other suggested phosphate substitutes in their washing action. In particular, they absorb colored soil, and thus save on chemical bleaches.

The invention concerns, furthermore, agents for carrying out the claimed method which contain the aluminosilicate calcium-binding substances and the surface-active components.

The aluminosilicate content of these agents can be in the range of 5 to 95%, preferably 15 to 60%, by weight. The surface-active component in the agents can be in the range of 3 to 40%, preferably 3 to 30%, by weight.

The agents according to the invention can also contain sequestering agents, or precipitating agents for calcium, whose action can be recognized at contents of 2 to 15%, depending on the chemical nature of the agent.

The amount of inorganic phosphates and/or organic phosphorus compounds in the agents according to the invention should not be greater than corresponds to a total phosphorus content of the agent of 6, preferably 3%.

All these percentages are percentages by weight, they relate to the anhydrous active substances (AS).

The other washing, cleaning or bleaching compounds contained in the washing agents comprise, for example, surface-active or non-surface-active foam stabilizers or inhibitors, textile softeners, neutral or alkaline-reacting builder salts, chemical bleaches, as well as stabilizers and/or activators for the latter. Other additives, which are mostly contained in small quantities are, for example, corrosion inhibitors, antimicrobial substances, soil suspension agents, enzymes, brighteners, dyes and perfumes.

The composition of typical textile washing agents to be used in the temperature range of 50° to 100° C fall in the range of the following recipe:

3% to 30% of nonionic and, optionally, anionic surface-active compounds as defined above
5% to 70% of aluminosilicates (related to AS)
2% to 45% of sequestering agents for calcium
0 to 50% of wash alkalies not capable of sequestration (alkaline builder salts)
0 to 50% of bleaches as well as other additives mostly contained in detergents in small quantities.

A list of substances suitable for use in the agents according to the invention follows:

The nonionic surface-active compounds to be utilized according to the invention in the mixture of ethoxylated compounds of varying amounts of ethoxylation are the products of addition of 2 to 6 or, respectively, 8 to 20 mols of ethylene oxide to 1 mol of a compound having from 8 to 18 carbon atoms and a labile hydrogen atom such as fatty alcohols, alkylphenols, fatty acids, fatty amines, fatty acid amides or alkanesulfonamides. Especially important are the purely aliphatic nonionics derived, for example, from coconut or tallow fatty alcohols, from oleyl alcohol or from secondary alkanols with 8 to 18, preferably 12 to 18 carbon atoms.

Also the products of addition of ethylene oxide to terminal or non-terminal vicinal alkanediols having from 8 to 18 carbon atoms can be used as nonionic surface-active compounds, with 2 to 4 or respectively 8 to 14 ethyleneglycol ether units in the molecule being preferred.

The anionic surface-active compounds or tensides contain in the molecule at least one hydrophobic organic moiety and one water-solubilizing, anionic group. The hydrophobic moiety is mostly an aliphatic hydrocarbon radical with 8 to 26, preferably 10 to 22 and particularly 12 to 18 carbon atoms or an alkyl aromatic radical, such as alkylphenyl, with 6 to 18, preferably 8 to 16 aliphatic carbon atoms.

Among the anionic surface-active compounds are, for example, soaps of natural or synthetic, preferably saturated, fatty acids, optionally, also, soaps of resinic or naphthenic acids. Suitable synthetic anionic tensides are those of the type of the sulfonates, sulfates and synthetic carboxylates.

Suitable anionic tensides of the sulfonate type are alkylbenzene sulfonates ($C_{9-15}$ alkyl) mixtures of alkenesulfonates and hydroxyalkanesulfonates, as well as alkanedisulfonates, as they are obtained, for example, from monoolefins with terminal or non-terminal double bonds by sulfonation with gaseous sulfur trioxide and subsequent alkaline or acid hydrolysis of the sulfonation products. Also suitable are alkanesulfontes which are obtained from alkanes by sulfochlorination of sulfoxidation and subsequent hydrolysis or neutralization or by bisulfite addition to olefins. Other suitable tensides of the sulfonate type are the esters of $\alpha$-sulfofatty acids, for example, the $\alpha$-sulfonic acids of hydrogenated methyl or ethyl esters of coconut, palmkernel or tallow fatty acids.

Suitable tensides of the sulfate type are the sulfuric acid monoesters of primary alcohols (e.g. from coconut fatty alcohols, tallow fatty alcohols or oleyl alcohol) and those of secondary alcohols. Also suitable are sulfated fatty acid alkanolamides, sulfated fatty acid monoglycerides or sulfated reaction products of 1 to 4 mols of ethylene oxide with primary or secondary fatty alcohols of alkylphenols.

Other suitable anionic tensides are the fatty acid esters or amides of hydroxy- or amino-carboxylic acids or sulfonic acids, such as the fatty acid sarcosides, fatty acid glycolates, fatty acid lactates, fatty acid taurides or fatty acid isoethionates.

The anionic tensides can be present in the form of their alkali metal salts, such as the sodium or potassium salts, the ammonium salts, as well as soluble salts of organic bases, such as the lower alkylolamines, for example, mono-, di- or triethanol amine.

The foaming power of the tenside can be increased or reduced by combination of suitable tenside types. A reduction can also be achieved by additions of non-surface-active organic substances.

A reduced foaming power, that is desirable for the use in washing machines, is often attained by combination of different tenside types, such as of sulfates and/or sulfonates with the nonionics, and/or with soaps. In soaps, the foam inhibition increases with the degree of saturation and the number of carbons in the fatty acid residue. Soaps derived from saturated $C_{20-24}$ fatty acids have been proven good as foam inhibitors.

The non-tenside foam inhibitors included N-alkylated aminotriazines, optionally containing chlorine, which are obtained by the reaction of 1 mol of cyanuric acid chloride with 2 to 3 mols of a mono- and/or dialkylamine with 6 to 20, preferably 8 to 18 carbon atoms in the alkyl radicals. Similarly effective are propoxylated and/or butoxylated aminotriazines, such as, products that are obtained by the addition of from 5 to 10 mols of propylene oxide to 1 mol of melamine and further addition of from 10 to 50 mols of butylene oxide to this propylene-oxide derivative.

Likewise suitable as non-tenside foam inhibitors are water-insoluble organic compounds, like paraffins, or halogenated paraffins with melting points below 100° C, aliphatic $C_{18}$ to $C_{40}$ ketones, as well as aliphatic carboxylic acid esters which contain in the acid or alcohol residue, optionally, also in both of these residues, at least 18 carbon atoms (such as triglycerides or fatty acid/fatty alcohol esters). These compounds can be used to reduce foaming, particularly in combinations of tensides of the sulfate and/or sulfonate type with soaps. Also alkali-stable silicones may be incorporated as non-tenside foam inhibitors.

Weakly acid, neutral or alkaline-reacting inorganic or organic salts can be used as builder salts.

Suitable weakly acid, neutral or alkaline-reacting salts for use according to the invention are, for example, the bicarbonates, carbonates, borates or silicates of the alkali metals, alkali metal sulfates, as well as the alkali metal salts of organic, non-surface-active sulfonic acids, carboxylic acids and sulfocarboxylic acids containing from 1 to 8 carbon atoms. These include, for example, water-soluble salts of benzenesulfonic acid, toluenesulfonic acid or xylenesulfonic acid, water-soluble salts of sulfoacetic acid, sulfobenzoic acid or of sulfodicarboxylic acids.

The compounds mentioned above as sequestering or precipitating agents for calcium are suitable as builder salts. They can, therefore, be present in the agents according to the invention in larger quantities than is necessary to perform their function as sequestering or precipitating compounds for calcium.

The individual components of the products used as textile washing compositions, particularly the builder salts, are mostly so selected that the preparations react neutral to strongly alkaline, so that the pH-value of a 1% solution of the preparation is mostly in the range of 7 to 12. Fine washing agents show mostly a neutral to weakly reaction (pH value = 7 to 9.5) while soaking agents, prewashing agents and boiling washing agents are more alkaline (pH value = 9.5 to 12, preferably 10 to 11.5.

Among the compounds serving as bleaching agents and releasing $H_2O_2$ in water, sodium perborate tetrahydrate ($NaBO_2 \cdot H_2O_3 \cdot 3\ H_2O$) and the monohydrate ($NaBO_2 \cdot H_2O_2$) are of particular importance. But also other $H_2O_2$ releasing borates can also be used, such as perborax $Na_2B_4O_7 \cdot 4\ H_2O$. These compounds can be replaced partly or completely by other carriers of active oxygen, particularly by peroxyhydrates, such as peroxycarbonates, ($Na_2CO_3 \cdot 1.5\ H_2O_2$), peroxypyrophosphates, citrate perhydrates, urea-$H_2O_2$ compounds, as well as by $H_2O_2$-releasing peracid salts, such as Caroates ($KHSO_5$), perbenzoates or peroxyphthalates.

It is recommended to incorporate water-soluble and-/or water-insoluble stabilizers for the peroxy compounds together with the latter in amounts of 0.25% to 10% by weight. Water-insoluble stabilizers, which amount to 1% to 8%, preferably 2% to 7% of the weight of the entire preparation are, for example, the silicates magnesium having a MgO : $SiO_2$ ratio of 4:1 to 1:4, preferably 2:1 to 1:2, and particularly 1:1, which are mostly obtained by precipitation from aqueous solutions. In their place, other alkaline earth metal, cadmium or tin silicates of corresponding compositions are also usable. Also hydrous oxides of tin are suitable as stabilizers. Water-soluble stabilizers, which can be present together with water-insoluble stabilizers, are mostly the organic sequestering agents which can be added in amounts of 0.25% to 5%, preferably 0.5% to 2.5% of the weight of the entire preparation.

In order to obtain a satisfactory bleaching effect when washing at temperatures below 80° C, particularly in the range of 60° to 40° C, activator-containing bleaching components are preferably incorporated in the preparations. Certain N-acyl and/or O-acyl compounds forming, with $H_2O_2$, organic per acids serve as activators for per compounds releasing $H_2O_2$ in water. Particularly to be mentioned are acetyl, propionyl or benzoyl compounds, as well as carbonic acid or pyrocarbonic acid esters. Suitable compounds are among others: the N-diacylated and N,N'-tetraacylated amines, such as N,N,N',N'-tetraacetyl-methylenediamine, N,N,N',N'-tetraacetyl-ethylenediamine, N,N-diacetylaniline and N,N-diacetyl-p-toluidine, or the 1,3-diacylated hydantoins and alkyl-N-sulfonyl-carbonamides, such as N-methyl-N-mesyl-acetamide, N-methyl-N-mesyl-benzamide, N-methyl-N-mesyl-p-nitrobenzamide, and N-methyl-N-mesyl-p-methoxybenzamide, the N-acylated cyclic hydrazides, acylated triazoles or urazoles, such as monoacetyl maleic acid hydrazide, the O,N,N-trisubstituted hydroxylamines, such as O-benzoyl-N,N-succinyl-hydroxylamine, O-acetyl-N,N-succinyl-hydroxylamine, O-p-methoxybenzoyl-N,N-succinyl-hydroxylamine, O-p-nitrobenzoyl-N,N-succinylhydroxylamine and O,N,N-triacetyl-hydroxylamine, the N,N'-diacyl-sulfuryl-amides, such as N,N'-dimethyl-N,N'-diacetyl-sulfurylamide, and N,N'-diethyl-N,N'-diethyl-N,N'-dipropionyl-sulfuryl amide, the triacyl cyanurates, such as triacetyl cyanurate or tribenzoyl cyanurate, the carboxylic acid anhydrides, such as benzoic acid anhydride, m-chlorobenzoic acid anhydride, phthalic acid anhydride, 4-chlorophthalic acid anhydride, the sugar esters, such as glucose pentaacetate, the 1,3-diacyl-4,5-diacyloxyimidazolidines, for example the compounds 1,3-diformyl-4,5-diacetoxy-imidazolidine, 1,3-diacetyl-4,5-diacetoxy-imidazolidine, 1,3-diacetyl-4,5-dipropionyloxy-imidazolidine, the acylated glycolurils, such as tetrapropionyl glycoluril or diacetyl-dibenzoyl glycoluril, the diacylated 2,5-diketopiperazines, such as 1,4-diacetyl-2,5-diketopiperazine, 1,4-dipropionyl-2,5-diketopiperazine, 1,4-dipropionyl-3,6-dimethyl-2,5-diketopiperazine, the acetylated or benzolylated products of propylenediurea or 2,2-dimethylpropylene diurea [2,4,6,8-tetraazabicyclo-(3,3,1)-nonane-3,7-dione or its 9,9 dimethyl derivative], and the sodium salts of p-ethoxycarbonyloxy)-benzoic acid and p-(propoxycarbonyloxy)-benzene sulfonic acid.

The active chlorine compounds serving as bleaching agents can be of an inorganic or organic nature.

The inorganic active chlorine compounds include alkaline metal hypochlorites, which can be used particularly in the form of their mixed salts or addition compounds with orthophosphates or on condensed phosphates such as with alkali metal pyrophosphates and polyphosphates, or with alkali metal silicates. If the washing agents and washing assistant compositions contain mono-persulfates and chlorides, active chlorine is formed in aqueous solution.

The organic active-chlorine compounds which can be used are particularly the N-chloro compounds, where one or two chlorine atoms are linked to a nitrogen atom, the third valence of the nitrogen atoms leading preferably to a negative group, particularly to a CO— or $SO_2$-group. These compounds include dichlorocyanuric acid and trichlorocyanuric acid or their salts, chlorinated alkylguanides or alkylbiguanides, chlorinated hydantoins and chlorinated melamines.

The preparations according to the invention can furthermore contain soil suspension agents or dirt carriers, which keep the dirt released from the fibers in suspension in the liquor and so prevent graying. Suitable compounds are water-soluble colloids, mostly of an organic nature, such as the water-soluble salts of polymeric carboxylic acids, glue, gelatin, salts of ether carboxylic acids or ether sulfonic acids of starch or cellulose, or salts of acid sulfuric acid esters of cellulose or starch. Water-soluble polyamides containing acid groups are also suitable for this purpose. Furthermore, soluble starch preparations and other than the above-mentioned starch products can be used, for example, degraded starches, aldehyde starches etc. Polyvinyl pyrrolidone can also be used.

The enzyme preparations to be used are mostly a mixture of enzymes with different effects, such as proteases, carbohydrases, esterases, lipases, oxidoreductases, catalases, peroxidases, ureases, isomerases, lyases, transferases, desmolases, or nucleases. Of particular interest are the enzymes, obtained from bacteria strains or from fungi, such as Bacillus subtilis or Streptomyces griseus, particularly proteases and amylases, which are relatively stable towards alkalis, percompounds, and anionic tensides and are still effective at temperatures up to 70° C.

Enzyme preparations are marketed by the manufacturers mostly as aqueous solutions of the active substances or as powders, granulates or as cold-sprayed products. They frequently contain sodium sulfate, sodium chloride, alkali metal ortho-, pyro- and polyphosphates, particularly tripolyphosphate, as fillers. Dust-free preparations are particularly valued. These are obtained in a known manner by incorporating of oily or pasty Nonionics or by granulation with the aid of melts of water-of-crystallization-containing salts in their own water-of-crystallization.

Enzymes may be incorporated which are specific for certain types of soil, for example, proteases or amylases or lipases. Preferably, combinations of enzymes with different effects are used, particularly combinations of proteases and amylases.

The washing agents can contain optical brighteners such as those for cotton, particularly derivatives of diaminostilbenedisulfonic acid or its alkali metal salts. Suitable are, for example, salts of 4,4'-bis-(2-anilino-4-morpholino-1,3,5-triazin-6-yl-amino)-stilbene-2,2'-disulfonic acid or similarly compounds which have instead of the morpholino group, a diethanolamino group, a methylamino group or a 2-methoxyethylamino group. Brighteners for polyamide fibers which can be used are those of the type of the 1,3-diaryl-2-pyrazolines, for example, the compound 1-(p-sulfamoylphenyl)-3-(p-chlorophenyl)-2-pyrazoline, as well as compounds of similar composition which have instead of the sulfamoyl group, for example, the methoxycarbonyl group, the 2-methoxyethoxycarbonyl group, the acetylamino group or the vinylsulfonyl group. Suitable polyamide brighteners are also the substituted aminocumarins, for example, 4-methyl-7-dimethylamino-cumarin or 4-methyl-7-diethylaminocumarin. Furthermore, the compounds 1-(2-benzimidazolyl)-2-(1-hydroxyethyl-2-benzimidazolyl)-ethylene and 1-ethyl-3-phenyl-7-diethylamino-carbostyril can also be used as polyamide brighteners. Brighteners for polyester and polyamide fibers which can be used are the compounds 2,5-di-(2-benzoxazolyl)-thiophene,2-(2-benzoxazolyl)-naphtho-[2,3-b]thiophene and 1,2-di-(5-methyl-2-benzoxazolyl)-ethylene. Furthermore, brighteners of the type of the substituted 4,4'-distyryl-diphenyls can be utilized, for example, the compound 4,4'-bis-(4-chloro-3-sulfostyryl)-diphenyl. Mixtures of the above-mentioned brighteners can likewise be used.

Of great practical interest are agents according to the invention of powdered to granular consistency which can be produced according to any method known in the art.

Thus, for example, the powdered aluminosilicates can be mixed in a simple manner with the other components of the washing agent, while spraying oily or pasty products, such as non-ionics, onto the powder. Another production possibility consists in incorporating the powdered aluminosilicates into the other components of the detergents in the form of an aqueous slurry which is then transformed into a powder by crystallization or by heat-drying to remove the water. After heat-drying, for example, on cylinders or in atomizing towers, heat-sensitive and moisture-sensitive components can then be incorporated, such as bleaching components and activators for the latter, enzymes, anti-microbial substances, etc.

The following specific embodiments are illustrative of the invention without being limitative in any respect.

EXAMPLES

First, the production of the finished aluminosilicates is described, for which no invention is claimed.

PROCESS CONDITIONS

The aluminate solution, diluted with deionized water was mixed in a vessel of 15 liter capacity, under vigorous stirring with the silicate solution. Both solutions were at room temperature. An X-ray amorphous sodium aluminosilicate was formed in the exothermic reaction as a primary precipitation product. After stirring for 10 minutes, the suspension of the precipitation product was either separated as an amorphous product or transferred to a crystallization vessel where it remained for some time at the elevated temperature given, to crystallize. After draining off the liquor from the crystals and washing with deionized water until the outflowing wash water had a pH-value of about 10, the filter residue was dried. When there is any deviation from this general production procedure, this is mentioned explicitly in the specific part. Thus, for example, in some cases for the practical tests, the homogenized uncrystallized suspension of the precipitation product or the crystal sludge was used. The water content was determined by heating the product for one hour to 800° C.

In the production of microcrystalline aluminosilicates, indicated by the suffix "*m*", the aluminate solution diluted with deionized water was mixed with the silicate solution and mixed in a high-speed intensive stirrer (10,000 rpm, "Ultraturrax," made by Janke & Kunkel IKA-Werk, Stauffen/Breisgau/Federal Republic of Germany). After vigorous stirring for 10 minutes, the suspension of the amorphous precipitation product was transferred to a crystallization vessel where the formation of large crystals was prevented by stirring the suspension. After draining off the liquor and washing with deionized water until the outflowing water had a pH value of about 10, the filter residue was dried, then ground in a ball mill and separated in a centrifugal sifter ("Microplex" air sifter, made by Alpine, Augsburg, Federal Republic of Germany) into two fractions, of which the finer fraction contained no portions above 10 $\mu$. The particle size distribution was determined by means of a sedimentation scale.

The degree of crystallization of an aluminosilicate can be determined from the intensity of the interference lines of an X-ray diffraction diagram of the respective product, compared to the corresponding diagrams of X-ray amorphous or fully crystallized products.

All data in % are in percent by weight.

The calcium binding power of the aluminosilicates or borosilicates was determined in the following manner. 1 liter of an aqueous solution, containing 0.594 gm of $CaCl_2$ (= 300 mg CaO/l = 30° dH) and adjusted to a pH of 10 with diluted NaOH, was mixed with 1 gm of the aluminosilicate or borosilicate (on the anhydrous basis, AS). Then the suspension was stirred vigorously for 15 minutes at a temperature of 22° C (± 2° C). After filtering off the aluminosilicate, the residual hardness *x* of the filtrate was determined. From it, the calcium binding power was calculated in mg CaO/gm. As according to the formula: $(30 - x) . 10$ If calcium binding power is determined at higher temperature, for example, at 60° C, better values are obtained than at 22° C. This fact distinguishes the aluminosilicates from most of the soluble sequestering agents that have been suggested so far for use in detergents and represents a particular technical progress in their use.

Production conditions for aluminosilicate I:

Precipitation:
- 2.985 kg of an aluminate solution of the composition: 17.7% $Na_2O$, 15.8% $Al_2O_3$, 66.6% $H_2O$
- 0.15 kg of sodium hdyroxide
- 9.420 kg of water
- 2.445 kg of a 25.8% sodium silicate solution of the composition 1 $Na_2O$. 6.0 $SiO_2$, prepared freshly from commercial waterglass and easily alkali-soluble silica Crystallization:
- 24 hours at 80° C Drying:
- 24 hours at 100° C Composition:
- 0.9 $Na_2O$ . 1 $Al_2O_3$ . 2.05 $SiO_2$ . 4.3 $H_2O$ (=21.6% $H_2O$)

Degree of crystallization:
- Fully crystalline

Calcium binding power:
- 150 mg CaO/gm AS.

If the product obtained was dried for 1 hour at 400° C, an aluminum silicate I*a* was obtained of the composition:

0.9 $Na_2O$ . 1 $Al_2O_3$ . 2.04 $SiO_2$. 2.0 $H_2O$ (=11.4% $H_2O$)

which is likewise suitable for the purposes of the invention.

Product conditions for aluminosilicate II

Precipitation:
- 2.115 kg of an aluminate solution of the composition: 17.7% $Na_2O$ 15.8% $Al_2O_3$, 66.5% $H_2O$
- 0.585 kg of sodium hydroxide
- 9.615 kg of water
- 2.685 kg of a 25.8% sodium silicate solution of the composition: 1 $Na_2O$. 6 $SiO_2$ (prepared as under I)

Crystallization:
- 24 hours at 80° C

Drying:
- 24 hours at 100° C and 20 torr.

Composition:
- 0.8 $Na_2O$. 1 $Al_2O_3$. 2.655 $SiO_2$. 5.2 $H_2O$

Degree of crystallization:
- Fully crystalline

Calcium binding power:
- 120 mg CaO/gm AS.

This product too can be dehydrated by drying (for 1 hour at 400° C) to the composition:

0.8 $Na_2O$ . 1 $Al_2O_3$. 2.65 $SiO_2$. 0.2 $H_2O$

This dehydration product II*a* is likewise suitable for the purposes of the invention.

The aluminosilicates I and II show in the x-ray diffraction diagram the following interference lines.

d- values, recorded with Cu-$K_\alpha$- radiation in A

| I | II |
|---|---|
| — | 14.4 |
| 12.4 | — |
| — | 8.8 |
| 8.6 | — |
| 7.0 | — |
| — | 4.4 (+) |
| 4.1 (+) | — |
| — | 3.8 (+) |
| 3.68 (+) | — |
| 3.38 (+) | — |
| 3.26 (+) | — |
| 2.96 (+) | — |
| — | 2.88 (+) |
| — | 2.79 (+) |
| 2.73 (+) | — |
| — | 2.66 (+) |
| 2.60 (+) | — |

It is quite possible that not all these interference lines will appear in the X-ray diffraction diagram, particularly if the aluminosilicates are not fully crystallized. For this reason, the d-values which are the most important for the characterization of these types are identified by a "(+)".

Production conditions for aluminosilicate III

Precipitation:
- 2.985 kg of an aluminate solution of the composition: 17.7% $Na_2O$, 15.8% $Al_2O_3$, 66.5% $H_2O$
- 0.150 kg of sodium hydroxide
- 9.420 kg of water
- 2.445 kg of a 25.8% sodium silicate solution of the composition: 1 $Na_2O$. 6 $SiO_2$ (prepared as in I)

Crystallization:
- none, amphorous precipitate

Drying:
- 24 hours at 25° C and 20 torr.

Composition:
- 0.9 $Na_2O$ . 1 $Al_2O_3$ . 2.04 $SiO_2$ . 47 $H_2O$

Degree of crystallization:
- X-ray amorphous

Calcium binding power:
- 160 mg CaO/gm AS.

Production conditions for aluminosilicate IV

Precipitation:
- 2.985 kg of an aluminate solution of the composition: 17.7% $Na_2O$, 15.8% $Al_2O_3$, 66.5% $H_2O$
- 0.150 kg of sodium hydroxide
- 9.420 kg of water
- 2.445 kg of a 25.8% sodium silicate solution of the composition: 1 $Na_2O$ . 6 $SiO_2$ *(prepared as in I)*

Crystallizaton:
- None, amorphous precipitate

Drying:
- 24 hours at 100° C, then 1 hour at 400° C

Composition:
- 0.9 $Na_2O$ . 1 $Al_2O_3$ . 2.04 $SiO_2$ . 0.1 $H_2O$

Degree of crystallization
- X-ray amorphous

Calcium binding power:

Due to the extensive drying of the amorphous precipitate, the calcium binding power was reduced to 20 mg CaO/gm AS: the product was practically unsuitable for the purposes of the invention.

Production conditions for aluminosilicate V:

Precipitation:
4.17 kg of solid aluminate of the composition: 38% $Na_2O$, 62% $Al_2O_3$
10.83 kg of a 34.9% sodium silicate solution of the composition: 1 $Na_2O$ . 3.46 $SiO_2$
Crystallization:
None, amorphous precipitate
Drying:
24 hours at 100° C
Composition:
1.5 $Na_2O$ . 1 $Al_2O_3$ . 2 $SiO_2$ . 3 $H_2O$
Degree of crystallization:
X-ray amorphous
Calcium binding power:
140 mg CaO/gm AS Production conditions for aluminosilicate VI Precipitation:
8.37 kg of an aluminate solution of the composition: 20.0% $Na_2O$, 10.2% $Al_2O_3$, 69.8% $H_2O$
0.09 kg of sodium hydroxide
5.34 kg of water 1.20 kg of microcrystalline silica (Aerosil)
Crystallization:
None, amorphous precipitate
Drying:
24 hours at 100° C
Composition: 0.9 $Na_2O$ . 1 $Al_2O_3$ . 2.04 $SiO_2$ . 6.7 $H_2O$
Degree of crystallization:
X-ray amorphous
Calcium binding power:
145 mg CaO/gm As Production conditions for aluninosilicate VII Precipitation:
3.255 kg of an aluminate solution of the composition: 17.7% $Na_2O$, 15.8% $Al_2O_3$, 66.5% $H_2O$
0.06 kg of sodium hydroxide
9.465 kg of water
2.22 kg of a 34.9% sodium silicate solution of the composition: 1 $Na_2O$ . 3.46 $SiO_2$
Crystallization:
None, amorphous precipitate
Drying:
24 hours at 100° C
Composition:
1 $Na_2O$ . 1 $Al_2O_3$ . 2 $SiO_2$ . 1 $H_2O$ (=6% $H_2O$)
Degree of crystallization:
X-ray amorphous
Calcium binding power:
150 mg CaO/gm AS Production conditions for aluminosilicate VIII Precipitation:
2.115 kg of an aluminate solution of the composition: 17.7% $Na_2O$, 15.8% $Al_2O_3$, 66.5% $H_2O$
0.585 kg of sodium hydroxide
9.615 kg of water
2.685 of a 25.8% sodium silicate solution of the composition: 1 $Na_2O$ . 6 $SiO_2$
Crystallization:
None, amorphous precipitate
Drying:
24 hours at 100° C
Composition:
0.8 $Na_2O$ . 1 $Al_2O_3$ . 2.65 $SiO_2$ . 4 $H_2O$
Degree of crystallization:
X-ray amorphous
Calcium binding power:
60 mg CaO/gm AS Production conditions for aluminosilicate IX Precipitation:
3.41 kg of an aluninate solution of the composition: 21.4% $Na_2O$, 15.8% $Al_2O_3$, 63.2% $H_2O$
10.46 kg of water
1.13 kg of a 34.9% sodium silicate solution of the composition: 1 $Na_2O$ . 3.46 $SiO_2$
Crystallization:
None, amorphous precipitate
Drying:
24 hours at 100° C
Composition: 1 $Na_2O$ . 1 $Al_2O_3$ . 1 $SiO_2$ . 1.4 $H_2O$
Degree of crystallization:
X-ray amorphous
Calcium binding power:
120 mg CaO/gm AS Production conditions for aluminosilicate X Precipitation:
2.835 kg of an aluminate solution of the composition: 14.2% $Na_2O$, 17.2% $Al_2O_3$, 68.6% $H_2O$
6.93 kg of water
5.235 kg of a 34.9% sodium silicate solution of the composition: 1 $Na_2O$ . 3.46 $SiO_2$
Crystallization:
None, amorphous precipitate
Drying:
24 hours at 100° C
Composition:
1 $Na_2O$ . 1 $Al_2O_3$ . 5 $SiO_2$ . 2.8 $H_2O$
Degree of crystallization:
X-ray amorphous
Calcium binding power:
100 mg CaO/gm AS Production conditions for aluminosilicate XI Precipitation:
2.86 kg of an aluminate solution of the composition: 13.8% $Na_2O$, 16.7% $Al_2O_3$, 69.5% $H_2O$
6.01 kg of water
6.13 kg of a 34.9% sodium silicate solution of the composition: 1 $Na_2O$ . 3.46 $SiO_2$
Crystallization:
None, amorphous precipitate
Drying:
24 hours at 100° C
Composition:
About 1 $Na_2O$ . 1 $Al_2O_3$ . 6 $SiO_2$ . 3.2 $H_2O$
Degree of crystallization:
X-ray amorphous
Calcium binding power:
60 mg CaO/gm AS Production conditions for aluminosilicate XII Precipitation:
2.01 kg of an aluminate solution of the composition: 20% $Na_2O$, 10.2% $Al_2O_3$, 69.8% $H_2O$ 1.395 kg of sodium hydroxide
9.045 kg of water
2.19 kg of a 25.8% sodium silicate solution of the composition: 1 $Na_2O$ . 6 $SiO_2$ (prepared as under I)

Crystallization:
24 hours at 80° C

Drying:
24 hours at 100° C

Composition:
0.9 $Na_2O$ . 1 $Al_2O_3$ . 2 $SiO_2$ . 3 $H_2O$

Degree of crystallization:
Fully crystalline

Calcium binding power:
160 mg CaO/gm AS

Production conditions for aluminosilicate XIII

Precipitation:
2.985 kg of aluminate solution of the composition: 17.7% $Na_2O$, 15.8% $Al_2O_3$, 66.5% $H_2O$
0.150 kg of sodium hydroxide
9.520 kg of water
2.445 kg of a 25.8% sodium silicate solution of the composition: 1 $Na_2O$ . 6 $SiO_2$ (prepared as in I)

Crystallization:
24 hours at 80° C

For the production of a potassium aluminosilicate, the liquor was drained off, the residue washed with water and suspended in an aqueous KCl solution. After heating for 30 minutes to 80°–90° C, the product was filtered off and wahsed.

Drying:
24 hours at 100° C

Composition:
0.28 $Na_2O$ . 0.62 $K_2O$ . 1 $Al_2O_3$ . 2.04 $SiO_2$ . 4.3 $H_2O$ Degree of crystallization:
Fully crystalline Calcium binding power:
170 mg CaO/gm AS Production conditions for aluminosilicate XIV Precipitation:
8.450 kg of an aluminate solution of the composition: 11.3% $Na_2O$, 18.7% $Al_2O_3$, 70.0% $H_2O$
6.550 kg of a 34.9% sodium silicate solution of the composition: 1 $Na_2O$ . 3.46% $SiO_2$ Crystallization:
None, amorphous precipitate Drying
None Composition:
1.5 $Na_2O$ . 1 $Al_2O_3$ . 2 $SiO_2$ . x $H_2O$ Degree of crystallization:
X-ray amorphous Calcium binding power:
120 mg CaO/gm AS Production conditions for aluminosilicate XV Precipitation:
As for aluminosilicate XIV Crystallization:
24 hours at 80° C Drying:
None Composition:
1.5 $Na_2O$ . 1 $Al_2O_3$ . 2 $SiO_2$ . x $H_2O$ Degree of crystallization:
Fully crystalline Calcium binding power:
170 mg CaO/gm AS Production conditions for borosilicate XVI Precipitation:
320 kg of a borate solution of the composition: 19.7% $Na_2O$, 19.7% $B_2O_3$, 60.6% $H_2O$
9.55 kg of water
2.55 kg of a 34.5% sodium silicate solution of the composition: 1 $Na_2O$ . 3.46 $SiO_2$ Crystallization:
24 hours at 80° C Drying:
24 hours at 100° C and 20 torr.

Composition:
1.5 $Na_2O$ . 1 $B_2O_3$. 2 $SiO_2$ . 1.5 $H_2O$

Degree of crystallization:
Primarily crystalline

Calcium binding power:
120 mg CaO/gm AS

The primary particles sizes of the aluminosilicates or borosilicates I – XVI described here range from 10 to 45 mμ.

Production conditions for aluminosilicates Im

Precipitation:
As in aluminosilicate I

Crystallization:
6 hours at 90° C

Drying:
24 hours at 100° C

Composition:
0.9 $Na_2O$ . 1 $Al_2O_3$ . 2.05 $SiO_2$ . 4.3 $H_2O$ (=21.6% $H_2O$)

Degree of crystallization:
Fully crystalline

Calcium binding power:
170 mg CaO/gm AS

Production conditions for aluminosilicate IIm

Precipitation:
As for aluminosilicate II

Crystallization:
12 hours at 90° C

Drying:
24 hours at 100° C and 20 torr.

Composition:
0.8 $Na_2O$ . 1 $Al_2O_3$ . 2.655 $SiO_2$ . 5.2 $H_2O$

Degree of crystallization:
Fully crystalline

Calcium binding power:
145 mg CaO/gm AS

Production conditions for aluminosilicate XIIm

Precipitation:
As for aluminosilicate XII

Crystallization:
6 hours at 90° C

Composition:
0.9 $Na_2O$ . 1 $Al_2O_3$ . 2 $SiO_2$ . 3 $H_2O$

Degree of crystallization:
Fully crystalline

Calcium binding power:
175 mg CaO/gm AS

Production conditions for aluminosilicate XIIIm

Precipitation:

As for aluminosilicate XIII

Crystallization:

6 hours at 90° C

For the production of the potassium aluminosilicate the liquior was drained off, the residue was washed with water and suspended in an aqueous KCl solution. The product was filtered off after heating for 30 minutes to 80°-90° C and washed.

Drying:

24 hours at 100° C

Composition:

0.28 $Na_2O$ . 0.62 $K_2O$ . 1 $Al_2O_3$ . 2.04 $SiO_2$ . 4.3 $H_2O$

Degree of crystallization:

Fully crystalline

Calcium binding power:

180 mg CaO/gm AS

Production conditions for aluminosilicate XVm

Precipitation:

As for aluminosilicate XIV

Crystallization:

24 hours at 80° C

Drying:

The filter caks was not dried but suspended in water after washing and used in this form for the application tests.

Composition:

0.9 $Na_2O$ . 1 $Al_2O_3$ . 2 $SiO_2$ . x $H_2O$

Degree of crystallization:

Fully crystalline

Calcium binding power:

170 mg CaO/gm AS

Production conditions for aluminosilicate XVIIm

Precipitation

As for aluminosilicate XIV

Crystallization:

24 hours at 90° C

Drying:

24 hours at 100° C

Composition:

0.92 $Na_2O$ . 1 $Al_2O_3$ . 1.8 $SiO_2$ . 3.71 $H_2O$

Degree of crystallization:

Fully crystalline

Calcium binding power:

180 mg CaO/gm AS.

Production conditions for aluminosilicate XVIIIm

Precipitation:

As for aluminosilicate XIV

Crystallization:

6 hours at 90° C

Drying:

24 hours at 100° C

Composition:

0.9 $Na_2O$ . 1 $Al_2O_3$ . 2 $SiO_2$ . 4.4 $H_2O$

Degree of crystalliaation:

Fully crystalline

Calcium binding power:

172 mg CaO/gm AS

Production conditions for aluminosilicate XIXm

Precipitation:

2.96 kg of an aluminate solution of the composition: 17.7% $Na_2O$, 15.8% $Al_2O_3$, 66% $H_2O$ 0.51 kg of sodium hydroxide 8.45 kg of water 3.00 kg of a commercial sodium silicate solution of the composition: 8.0% $Na_2O$, 26.9% $SiO_2$, 65.1% $H_2O$ Crystallization:

12 hours at 90° C

Drying:

12 hours at 100° C

Composition:

0.93 $Na_2O$ . 1 $Al_2O_3$ . 2.75 $SiO_2$ . 5.5 $H_2O$

Degree of crystallization:

Fully crystalline

Calcium binding power:

125 mg CaO/gm AS

Production conditions for aluminosilicate XXm

Precipitation:

0.76 kg of an aluminate of the composition: 36.0% $Na_2O$, 59.0% $Al_2O_3$, 5.0% $H_2O$ 0.94 kg of sodium hydroxide 9.49 kg of water 3.94 kg of a commercial sodium silicate solution of the composition: 8.0% $Na_2O$, 26.9% $Al_2O_3$, 65.1% $H_2O$ Crystallization:

12 hours at 90° C

Drying:

12 hours at 100° C

Composition:

0.9 $Na_2O$ . 1 $Al_2O_3$ . 3.1 $SiO_2$ . 5 $H_2O$

Degree of crystallization:

Fully crystalline

Calcium binding power:

110 mg CaO/gm AS

The particle size of the above described microcrystalline products Im - XIIIm and XVIIm - XXm, determined by sedimentation analysis, was in the following range:

$> 40\ \mu$ = —0% —maximum range of the particle size $< 10\ \mu$ = —100% —distribution curve at 3 - 6 $\mu$ $< 8\ \mu$ = 50 -95%

The particle size distribution of the product XVm was in the following range:

$> 40\ \mu$ = 0% — maximum range of the particle size $< 10\ \mu$ = 100% — distribution curve at 1 - 3 $\mu$ $< 8\ \mu$ = 99%

The salt constituents contained in the detergents of the examples, such as surfactants in salt form, other organic salts, as well as inorganic salts, were present as sodium salt, unless explicitly stated otherwise. This also applies to the precipitation inhibitors or chelating agents which are designated for simplicity's sake as the corresponding acids. The designations and abbreviations used have the following meaning:

"ABS" the salt of alkylbenzenesulfonic acid with 10 to 15, preferably 11 to 13 carbon atoms in the alkyl chain obtained by condensation of straight-chain olefins with benzene and sulfonation of the alkylbenzene thus obtained.

"Alkanesulfonate" a sulfonate obtained by sulfoxidation of paraffins having 11 to 15 carbon atoms.

"HSt-sulfonate" a sulfonate obtained by sulfonating hydrogenated tallow fatty acid methyl ester with $SO_3$ "Olefinsulfonate" a sulfonate obtained from $\alpha$-olefin mixtures having 15 to 18 carbon atoms by sulfonating with $SO_3$ and hydrolyzing the sulfonation product with sodium hydroxide solution, consisting essentially of alkene sulfonate and hydroxyalkane sulfonate, but also containing small amounts of alkane disulfonates.

"Soap" the fatty acid component of a hardened mixture of equal parts by weight of tallow and rape oil fatty acids ($C_{18}$-$C_{22}$).

"OE + *x* EO" or "TA + *x* EO" or "KA + *x* EO" or "SA + *x* EO" or "OXO + *x* EO" the addition products of ethylene oxide (EO) to technical oleyl alcohol (OA) or to tallow fatty alcohol, iodine number = 0.5, (TA) or to a coconut fatty alcohol (KA) or to a secondary aliphatic $C_{11-15}$ alkanol (SA) or to a $C_{12-18}$ alkanol (OXO) obtained by oxo-synthesis, where the values for *x* indicate the molar amount of ethylene oxide added to 1 mol of alcohol:

"CTMS" the salt of O-carboxymethyl-tartronic acid;

"EDTA" the salt of ethylenediaminetetraacetic acid;

"HEDP" the salt of 1-hydroethane-1,1-diphosphonic acid;

"DMDP" the salt of dimethylaminomethane-diphosphonic acid;

"CMC" the salt of carboxymethyl cellulose.

The following table contains formulations of some washing agents according to the invention, recipes 1, 2 and 3 representing complete washing agents which are used in the household, in commercial operations and in the industry for washing colored or white textiles at temperatures of 40° to 100° C, preferably 50° to 100° C. The two products according to recipes 4 and 5 are intended for commercial and industrial laundries, the former being used in the pre-wash cycle, the latter in the main wash cycle 22.0% aluminosilicate V
5.5% Na citrate
1.3% CMC
8.3% $H_2O$

EXAMPLE 7

A washing agent intended for washing in particularly hard water has the following composition:

6.7% OXO + 10 EO
4.0% OXO + 4 EO
50.0% aluminosilicate VII
6.5% Na citrate
0.1% EDTA
3.1% $Na_2O$ . 3.3 $SiO_2$
20.3% $NaBO_2$. $H_2O_2$ . 3 $H_2O$
1.1% CMC
8.2% $Na_2SO_4$ + $H_2O$ The method of the invention or respectively the agents intended for its practice exhibit all advantages of the agents disclosed and claimed in the copending U.S. Pat. application Ser. No. 458,306, filed Apr. 5, 1974, now abandoned, and its continuation application Ser. No. 800,308, filed May 25, 1977, but compared with these, the presently claimed agents have a better fat-extracting ability. This manifests itself for example on collars and cuffs of shirts, in particular those of easycare cotton of of cotton-polyester blend textiles, and on fat-soiled work clothes, such as that of kitchen personnel, butchers, persons employed at tanking stations and in auto shops, etc.

The preceding specific embodiments are illustrative

| Component | % component in washing agent according to example | | | | |
|---|---|---|---|---|---|
| | 1 | 2 | 3 | 4 | 5 |
| TA + 14 EO | 3.8 | 6.5 | 5.0 | — | 9.6 |
| TA + 5 EO | 2.2 | 3.5 | — | — | 4.4 |
| KA + 3 EO | — | — | 2.5 | — | — |
| SA + 9 EO | — | — | — | 4.5 | — |
| SA + 3 EO | — | — | — | 1.8 | — |
| ABS | 7.0 | — | — | — | — |
| Olefinsulfonate | — | — | — | 3.5 | — |
| HSt-sulfonate | — | 2.5 | — | — | — |
| Alkanesulfonate | — | — | 3.0 | — | — |
| Soap | 3.4 | — | 3.0 | 2.0 | — |
| Foam inhibitor | — | 0.8 | — | 0.6 | — |
| Aluminosilicate I | 20.0 | — | — | — | — |
| Aluminosilicate V | — | 30.0 | — | — | — |
| Aluminosilicate VII | — | — | 25.0 | — | — |
| Aluminosilicate XII | — | — | — | 28.0 | — |
| Aluminosilicate XVIIm | — | — | — | — | 40.00 |
| $Na_5P_3O_{10}$ | 10.0 | — | 7.0 | — | — |
| CMTS | — | 8.0 | — | 7.5 | 10.0 |
| EDTA | 0.3 | 0.3 | — | — | — |
| $Na_2O$ . 3.3 $SiO_2$ | 5.0 | 5.0 | 5.5 | 4.5 | 5.0 |
| $Na_2CO_3$ | — | — | — | 7.0 | 8.5 |
| $NaBO_2$ . $H_2O_2$ . 3 $H_2O$ | 28.5 | 25.0 | 28.5 | — | — |
| $Na_2SO_4$ | 0.5 | 5.1 | 4.0 | 29.5 | 9.3 |
| $MgSiO_3$ | 2.0 | 2.0 | 4.0 | — | — |
| CMC | 1.5 | 1.6 | 1.6 | 1.8 | 1.5 |
| $H_2O$ balance to 100 | | | | | |

The EDTA may be replaced by the same quantity of HEDP or DMDP. The $Na_5P_3O_{10}$ may be replaced by the same quantity of a P-free phosphate substitute, as for example the salts of citric acid or of O-carboxymethyl-tartronic acid.

EXAMPLE 6

A washing agent intended for washing severely soiled work clothes has the following composition:

10.0% OA + 10 EO
8.0% OA + 5 EO
45.0% $Na_2CO_3$ of the practice of the invention. It is to be understood, however, that other expedients known to those skilled in the art or disclosed herein, may be employed without departing from the spirit of the invention or the scope of the appended claims. We claim:

1. A washing composition consisting essentially of:
3.8% by weight of the adduct of 14 mols of ethylene oxide onto tallow fatty alcohol,
2.2% by weight of the adduct of 5 mols of ethylene oxide onto tallow fatty alcohol,
7.0% by weight of the sodium salt of alkylbenzenesulfonic acid with 11 to 13 carbon atoms in the alkyl, 3.4% by weight of the sodium soap of a hardened mixture of equal parts by weight of tallow and rape oil fatty acids, 20.0% by weight of a finely-divided water-insoluble crystalline silicate compound having primary particles in the size range of from 10 to 45μ, and a calcium binding power as determined at 22° C for 15 minutes according to the procedure on page 32, lines 18 to 28, of 150 mg CaO/gm of anhydrous active substance, having the formula $$0.9\ Na_2O \cdot 1\ Al_2O_3 \cdot 2.05\ SiO_2 \cdot 4.3\ H_2O$$

and having the following d-values by X-ray diffraction 4.1, 3.68, 3.38, 3.26, 2.96, 2.73 and 2.60, 10.0% of sodium tripolyphosphate, 0.3% of the sodium salt of ethylenediaminetetraacetic acid, 5.0% of sodium silicate having a $Na_2O:SiO_2$ ratio of 1:3.3, 28.5% of sodium perborate tetrahydrate, 0.5% of sodium sulfate, 2.0% of magnesium silicate having a 1:1 ratio, 1.5% of the sodium salt of carboxymethylcellulose, and 15.8% of water, for use as a complete washing agent at temperatures of 50° to 100° C.

* * * * *